(12) United States Patent
Chandler et al.

(10) Patent No.: US 9,944,401 B2
(45) Date of Patent: Apr. 17, 2018

(54) ASYMMETRIC THRUST REVERSERS

(71) Applicant: United Technologies Corporation, Hartford, CT (US)

(72) Inventors: Jesse M. Chandler, South Windsor, CT (US); Gabriel L. Suciu, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 32 days.

(21) Appl. No.: 14/646,752

(22) PCT Filed: Mar. 15, 2013

(86) PCT No.: PCT/US2013/031844
§ 371 (c)(1),
(2) Date: May 22, 2015

(87) PCT Pub. No.: WO2014/092757
PCT Pub. Date: Jun. 19, 2014

(65) Prior Publication Data
US 2015/0291289 A1    Oct. 15, 2015

Related U.S. Application Data (60) Provisional application No. 61/735,730, filed on Dec. 11, 2012.

(51) Int. Cl.
*B64D 33/04* (2006.01)
*B64D 27/20* (2006.01)
(Continued)

(52) U.S. Cl.
CPC .......... *B64D 33/04* (2013.01); *B64C 5/02* (2013.01); *B64D 27/14* (2013.01); *B64D 27/20* (2013.01); *F02K 1/60* (2013.01)

(58) Field of Classification Search
CPC .......................................................... F02K 1/72
(Continued)

(56) References Cited

U.S. PATENT DOCUMENTS 3,655,133 A * 4/1972 Medawar ............... F02K 1/62
239/265.31
3,739,580 A * 6/1973 Bland .................... F02K 5/02
244/12.3

(Continued)

OTHER PUBLICATIONS

International Preliminary Report on Patentability for International Application No. PCT/US2013/031844 dated Jun. 25, 2015.
(Continued)

*Primary Examiner* — Brian M O'Hara
*Assistant Examiner* — Keith L Dixon
(74) *Attorney, Agent, or Firm* — Carlson, Gaskey & Olds, P.C.

(57) ABSTRACT

An aircraft includes a propulsion supported within an aft portion of a fuselage A thrust reverser is mounted in the aft portion of the fuselage proximate the propulsion system for directing thrust in a direction to slow the aircraft. The thrust reverser includes an upper blocker door movable about a first pivot axis to a deployed position and a lower blocker door movable about a second pivot axis not parallel to the first pivot axis.

10 Claims, 6 Drawing Sheets

(51) Int. Cl.
*F02K 1/60* (2006.01)
*B64C 5/02* (2006.01)
*B64D 27/14* (2006.01)

(58) Field of Classification Search
USPC ........................................................ 244/110 B
See application file for complete search history.

(56) References Cited

U.S. PATENT DOCUMENTS

| | | | | |
|---|---|---|---|---|
| 3,972,490 | A * | 8/1976 | Zimmermann | F02C 3/073 244/12.3 |
| 3,997,134 | A | 12/1976 | Drakeley | |
| 4,193,569 | A | 3/1980 | Nichols | |
| 4,485,970 | A * | 12/1984 | Fournier | F02K 1/70 239/265.29 |
| 5,230,213 | A * | 7/1993 | Lawson | F02K 1/563 244/110 B |
| 5,396,762 | A | 3/1995 | Standish | |
| 5,671,598 | A * | 9/1997 | Standish | F02K 1/563 239/265.29 |
| 5,778,659 | A | 7/1998 | Duesler et al. | |
| 5,819,527 | A * | 10/1998 | Fournier | F02K 1/76 244/110 B |
| 6,094,908 | A * | 8/2000 | Baudu | F02K 1/70 244/110 B |
| 6,256,979 | B1 * | 7/2001 | Fournier | F02K 1/60 239/265.37 |
| 6,487,845 | B1 * | 12/2002 | Modglin | F02K 1/60 239/265.29 |
| 6,543,718 | B2 | 4/2003 | Provost | |
| 6,688,099 | B2 | 2/2004 | Lair | |
| 6,792,746 | B2 * | 9/2004 | Saito | F02C 1/02 60/224 |
| 6,845,945 | B1 * | 1/2005 | Smith | B64D 33/04 239/265.19 |
| 7,146,796 | B2 * | 12/2006 | Lair | E05B 47/0607 239/265.25 |
| 7,540,450 | B2 | 6/2009 | Brand et al. | |
| 7,784,735 | B2 * | 8/2010 | Marche | B64D 29/06 244/110 B |
| 8,015,796 | B2 | 9/2011 | Babu et al. | |
| 8,127,532 | B2 | 3/2012 | Howe | |
| 8,701,386 | B2 * | 4/2014 | Letay | F02K 1/68 239/265.19 |
| 8,783,010 | B2 * | 7/2014 | Guillois | B64D 33/04 239/265.19 |
| 2010/0038472 | A1 | 2/2010 | Cazals et al. | |

OTHER PUBLICATIONS

International Search Report and Written Opinion for International Application No. PCT/US2013/031844 dated Jan. 16, 2014.

* cited by examiner

ASYMMETRIC THRUST REVERSERS

CROSS REFERENCE TO RELATED APPLICATION

This application claims priority to U.S. Provisional Application No. 61/735,730 filed on Dec. 11, 2012.

STATEMENT REGARDING FEDERALLY SPONSORED RESEARCH DEVELOPMENT

This invention was made with government support under NASA Cooperative Agreement No. NNX11AB35A. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Typically, the gas turbine engine is supported under an aircraft wing on either side of the fuselage. However, such under-wing installations may not be compatible with unique aircraft configurations. Accordingly, different mounting locations for the engines such as at the rear of the fuselage are being considered. Different mountings locations present different challenges and require alternate engine configurations.

A thrust reverser is utilized once an aircraft has landed, and creates a reverse thrust force to aid in slowing the aircraft. Typical thrust reversers and nozzles are components of the engine nacelle surrounding an under-wing mounted engine. Engines mounted within an aircraft fuselage do not include the same nacelle structures and therefore conventional thrust reversing devices may not be compatible.

Alternate aircraft architectures may require alternate mounting locations of the gas turbine engines to enable specific wing and fuselage configurations. However, conventional gas turbine engine configurations have been developed to operate with conventional aircraft architectures.

Accordingly, alternate gas turbine engine configurations may be required and developed to enable implementation of favorable aspects of alternate engine architectures.

SUMMARY

A thrust reverser for directing a portion of thrust produced by a propulsion system to slow an aircraft according to an exemplary embodiment of this disclosure, among other possible things includes an upper blocker door rotatable about a first pivot axis to a deployed position, and a lower blocker door rotatable about a second pivot axis to a deployed position. The first pivot axis is not parallel to the second pivot axis.

In a further embodiment of the foregoing thrust reverser, the first pivot axis is substantially horizontal and the second pivot axis is angled downward away from first pivot axis.

In a further embodiment of any of the foregoing thrust reversers, at least one of the upper and lower blocker doors includes a contoured aft edge defining an interface when the upper and lower doors are in the deployed position.

In a further embodiment of any of the foregoing thrust reversers, the upper blocker door includes first and second blocker doors and the lower blocker door includes first and second blocker doors and the first and second upper and lower blocker doors direct thrust generated through first and second bypass passages defined about corresponding first and second propulsor axes.

In a further embodiment of any of the foregoing thrust reversers, each of the first and second bypass passages include a bifurcation and each of the first and second upper doors and first and second lower doors include a contoured aft edge that close onto the bifurcation.

In a further embodiment of any of the foregoing thrust reversers, the first and second upper doors and the first and second lower doors close on a centerline disposed along corresponding first and second propulsor axes.

An aircraft according to an exemplary embodiment of this disclosure, among other possible things includes aircraft a fuselage including an aft portion, a propulsion system supported within the aft portion of the fuselage, and a thrust reverser mounted in the aft portion of the fuselage proximate to the propulsion system for directing thrust in a direction to slow the aircraft. The thrust reverser includes an upper blocker door rotatable about a first pivot axis to a deployed position and a lower blocker door rotatable about a second pivot axis not parallel to the first pivot axis.

In a further embodiment of the foregoing aircraft, wherein the first pivot axis is substantially horizontal and the second pivot axis is angled downward away from first pivot axis.

In a further embodiment of any of the foregoing aircrafts, at least one of the upper and lower blocker doors includes a contoured aft edge defining an interface when the upper and lower doors are in the deployed position.

In a further embodiment of any of the foregoing aircrafts, the upper blocker door includes first and second blocker doors and the lower blocker door includes first and second blocker doors and the first and second upper and lower blocker doors direct thrust generated through first and second bypass passages defined about corresponding first and second propulsor axes.

In a further embodiment of any of the foregoing aircrafts, the propulsion system includes a first engine core driving a first fan within the first bypass passage disposed about the first propulsor axis and a second engine core driving a second fan within the second bypass passage disposed about the second propulsor axis.

In a further embodiment of any of the foregoing aircrafts, the first and second lower blocker doors rotate about corresponding second pivot axes and are angled toward each other.

In a further embodiment of any of the foregoing aircrafts, the first and second doors and the first and second lower doors close on a corresponding one of the first propulsor axis and the second propulsor axis to capture both a bypass flow stream and a core flow stream.

In a further embodiment of any of the foregoing aircrafts, each of the first and second bypass passages include a bifurcation and each of the first and second upper doors and first and second lower doors include a contoured aft edge that close onto the bifurcation.

In a further embodiment of any of the foregoing aircrafts, the first and second upper doors and the first and second lower doors close on a centerline disposed along corresponding first and second propulsor axes.

In a further embodiment of any of the foregoing aircrafts, the aircraft includes first and second vertical stabilizer disposed on each side of the propulsion system and a horizontal stabilizer supported on the first and second vertical stabilizers.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
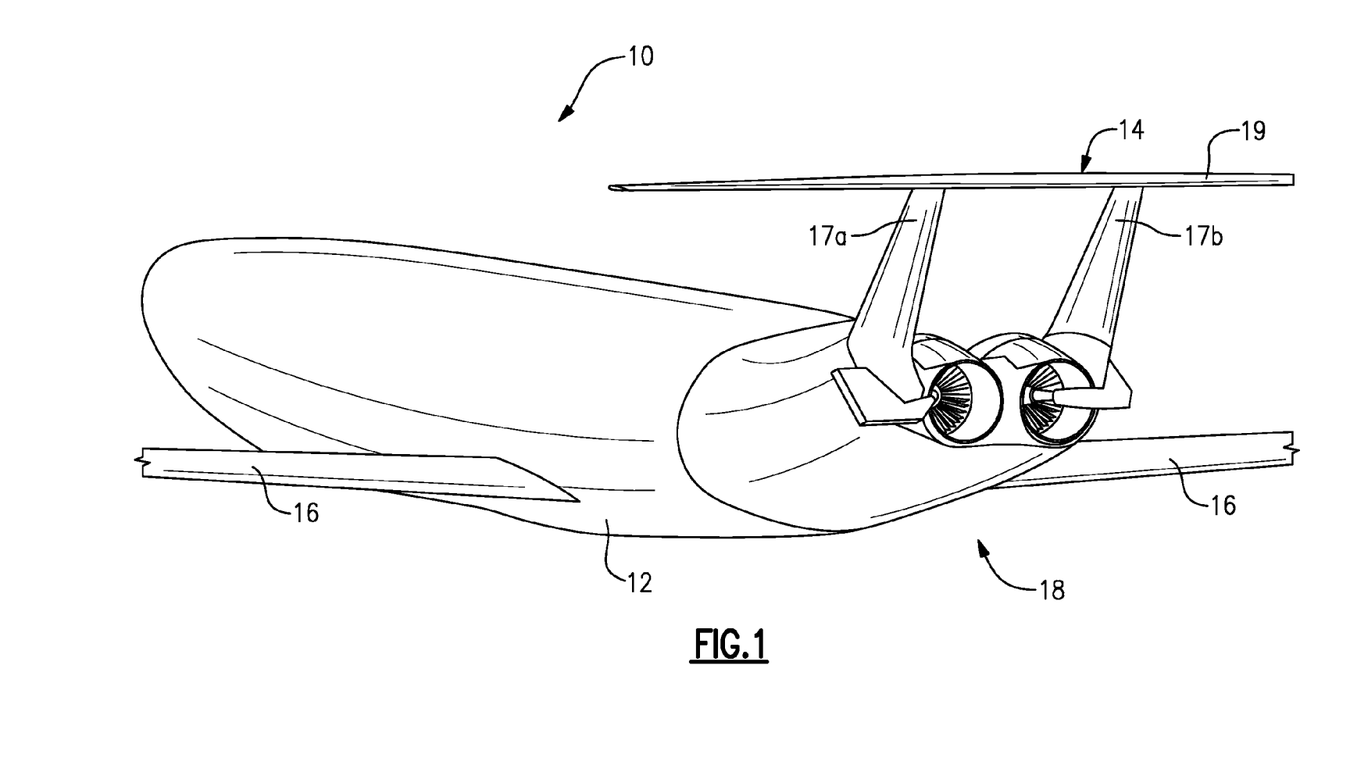
FIG. 1 schematically shows an example aircraft with a propulsion system mounted within a fuselage.
Figure 2:
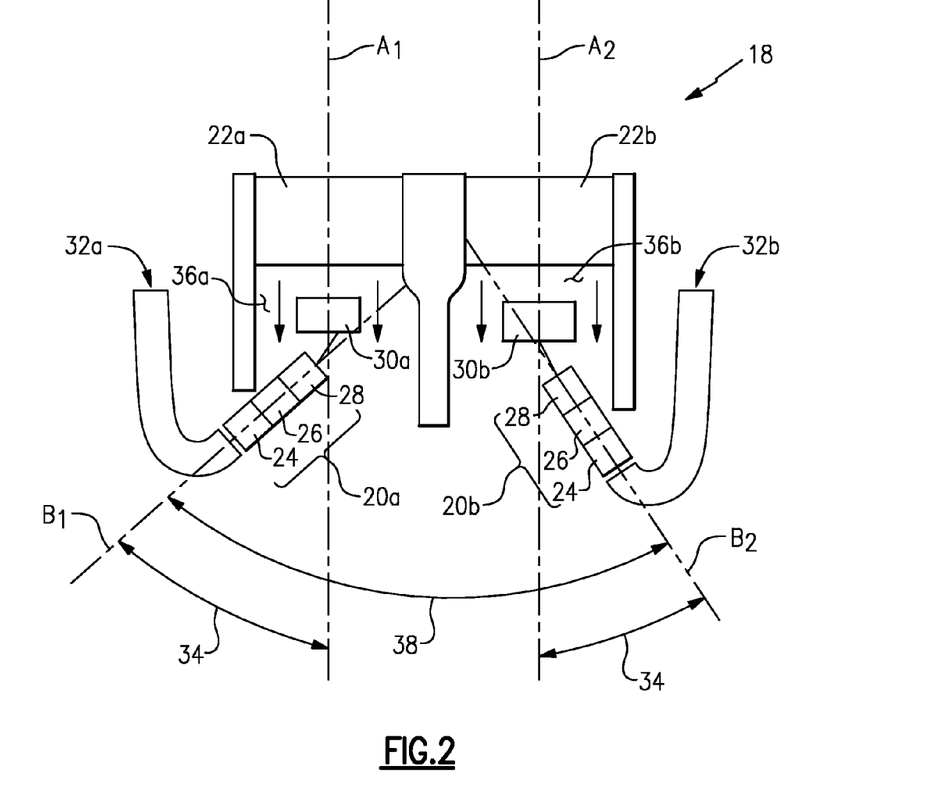
FIG. 2 is a schematic view of an example reverse flow gas turbine engine.

Referring to the FIGS. 1 and 2 an aircraft 10 includes a fuselage 12 having wings 16 and a tail 14. The tail 14 includes first and second vertical stabilizers 17a, 17b that supports a horizontal stabilizer 19. The horizontal stabilizer 19 extends across both the first and second vertical stabilizers 17a-b.

A propulsion system 18 is mounted in an aft end 15 of the fuselage 12. The propulsion system 18 includes first and second engine cores, which are gas generators, 20a-b that drive corresponding first and second propulsors, which include respective first and second fan sections 22a-b. The first and second fan sections 22a-b provide the propulsive thrust through corresponding first and second bypass passages 36a-b. The first and second fan sections 22a-b may also be referred to as propulsors.

Each of the fan sections 22a-b are disposed about corresponding first and second propulsor axis A1 and A2. The first and second engine core cores 20a-b is disposed about a corresponding first and second engine axis B1 and B2. That is the first engine core 20a is disposed about the first engine axis B1 and drives the first propulsor about the first propulsor axis A1. The second engine core 20b is disposed about the second engine axis B2 and drives the second fan section 20b about the second propulsor axis A2.

The example engine cores 20a-b are commonly referred to as reverse flow engines and include a compressor 24, a combustor 26 and a turbine 28. Air is drawn in through inlets 32a-b to the compressor 24 is compressed and communicated to a combustor 26. In the combustor 26, air is mixed with fuel and ignited to generate an exhaust gas stream that expands through the turbine 28 where energy is extracted and utilized to drive the compressor 24 and corresponding fan 22a-b. In this example the engine cores 20a-b drive the corresponding fan 22a-b through a corresponding one of a first and second geared architecture 30a-b. The first and second fans 22a-b are also considered part of the engine propulsors.

In the disclosed example, each of the first and second fans 22a-b is mounted substantially parallel to each other about respective propulsor axes A1, A2. The first and second engine axes B1, B2 are disposed at an angle 34 relative to the corresponding propulsor axis A1, A2. The engine cores 20a-b are also angled away from each other at an angle 38.

Figures 3, 4:
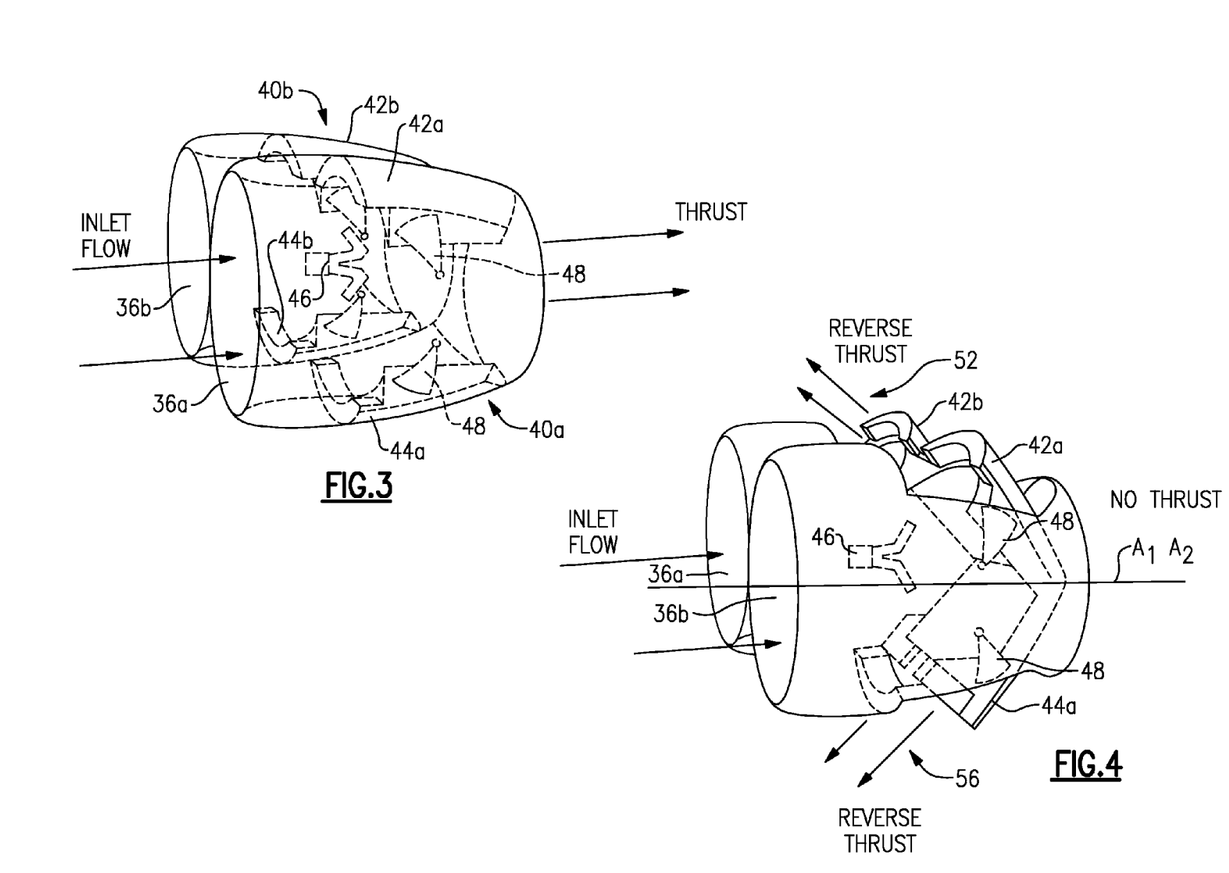
FIG. 3 is a schematic view of an example thrust reverser in a stowed position.
FIG. 4 is a schematic view of the example thrust reverser in a deployed position.

Referring to FIGS. 3 and 4, the aircraft 10 includes a thrust reverser for directing thrust to slow the aircraft 10 upon landing. The disclosed thrust reverser includes a first thrust reverser 40a and a second thrust reverser 40b for corresponding first and second bypass passages 36a-b. The first and second thrust reversers 40a-b include corresponding first and second upper doors 42a, 42b and first and second lower doors 44a, 44b.

The upper and lower doors 42a-b, 44a-b is movable between a stowed position (FIG. 3) and a deployed position (FIG. 4). Movement of the upper and lower doors 42a-b, 44a-b, is facilitated by pivots 48 that support rotation between stowed and deployed positions. An actuator 46 is provided to move the upper and lower doors 42a-b, 44a-b between the stowed and deployed positions.

In the stowed position, thrust flows unimpeded through the bypass passages 36a-b. In the deployed position, thrust is directed upwardly as indicated at 52 and downwardly as indicated at 56 about the propulsor axes A1, A2. The upward and downward directed thrust 52, 54 slows the aircraft 10 during landing. In some aircraft 10 architectures, the downward directed thrust 54 can generate undesired lift by directing thrust under the aircraft fuselage 12 or other surface. As appreciated, thrust that generates lift, or interferes with desired aircraft aerodynamic performance is undesirable.

Moreover, some aircraft structures that include control surfaces that can be affected by reverse thrust flow. In this example, the aircraft 10 includes first and second vertical stabilizers 17a-b, and a horizontal stabilizer that could be affected by thrust flow.

Figure 5:
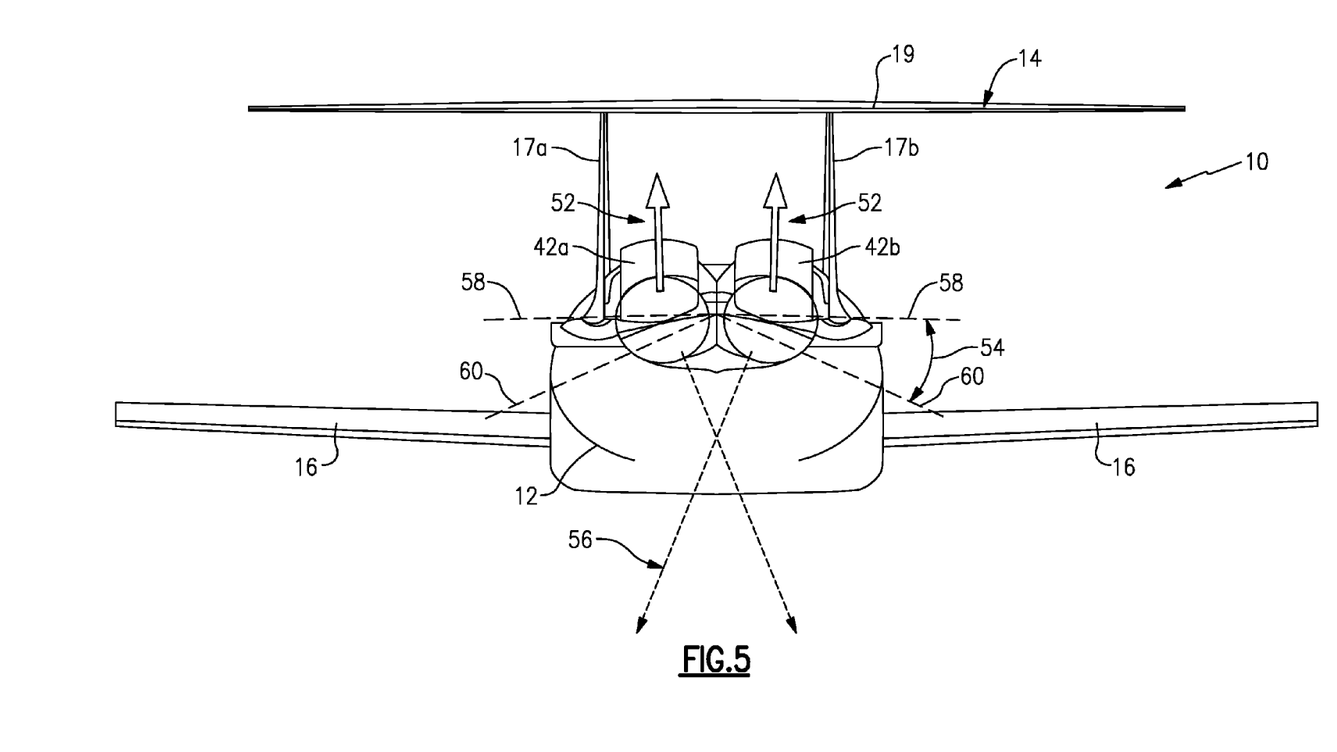
FIG. 5 is an aft view of the example aircraft with the thrust reverser in the deployed position.
Figure 6:
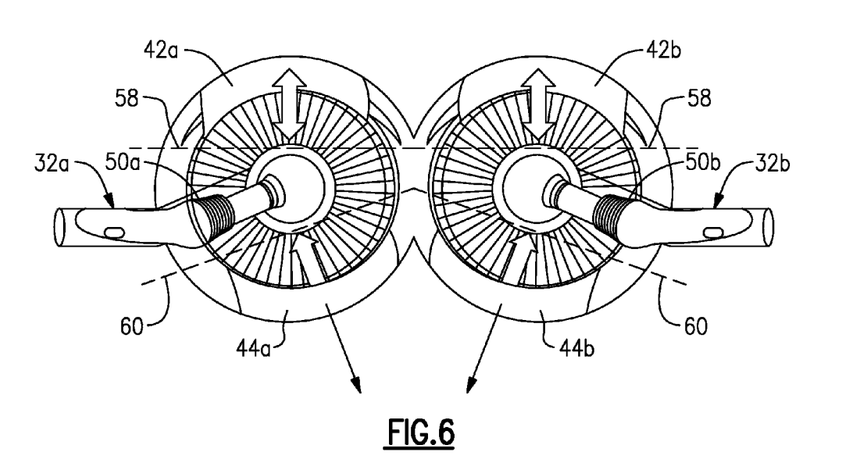
FIG. 6 is an aft view of the example thrust reverser in the stowed position.

Referring to FIGS. 5 and 6, the example thrust reversers 40a-b rotates the upper blocker doors 42a-b about a first pivot axis 58 that is substantially horizontal and the lower blocker doors 44a-b about a second pivot axis 60 that is not parallel with the first pivot axis 58. The second pivot axis 60 is angled downward at an angle 54 from the first pivot axis 58. The different orientations of the first pivot axis 58 relative to the second pivot axis 60 defines an asymmetric thrust reverser that directs thrust upward substantially vertically and downward at angle inward.

The upward thrust 52 is directed vertically upward between the first and second vertical stabilizers 17a-b. The upward directed thrust 52 therefore does not impact directly on the first and second vertical stabilizers 17a-b and therefore does not adversely impact control surfaces of the tail 14.

Moreover, the downward thrust 56 is directed inwardly from each of the first and second bypass passages 36a-b to combine under the fuselage 12. The downward and inward directed thrust 56 combine to cancel any lift generation forces induced on the fuselage 12. Accordingly, the upper and lower doors 42a-b, 44a-b are asymmetric to selectively and separately direct upward thrust 52 differently than downward thrust 56.

Figure 7:
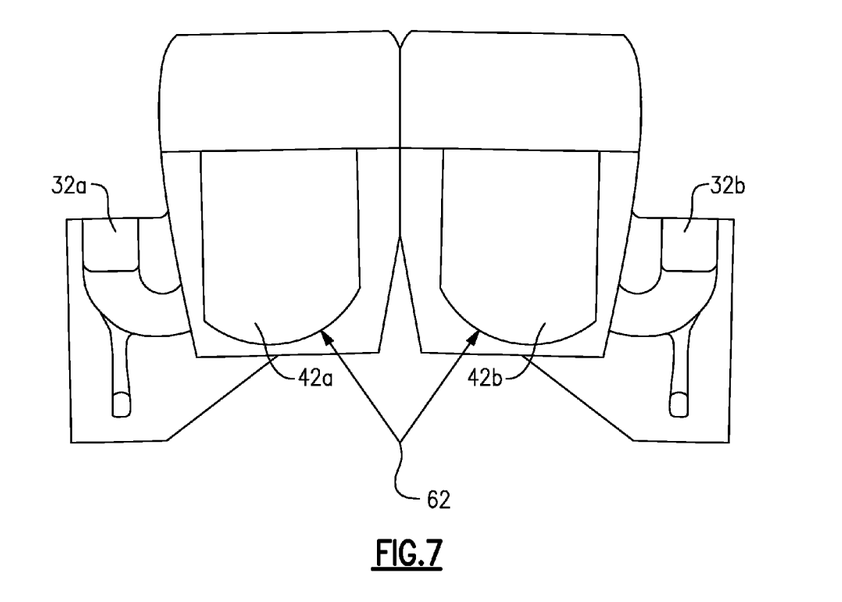
FIG. 7 is a top view of a portion of the thrust reverser including contoured aft edges.
Figure 8:
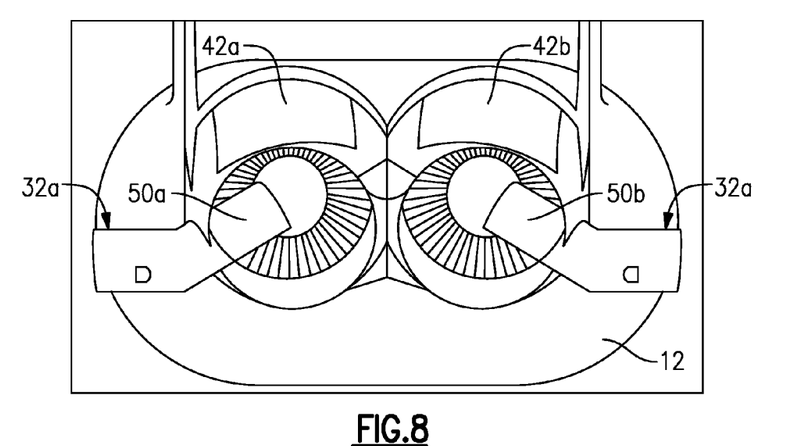
FIG. 8 is an aft view of the example thrust reverser in the stowed position.
Figure 9:
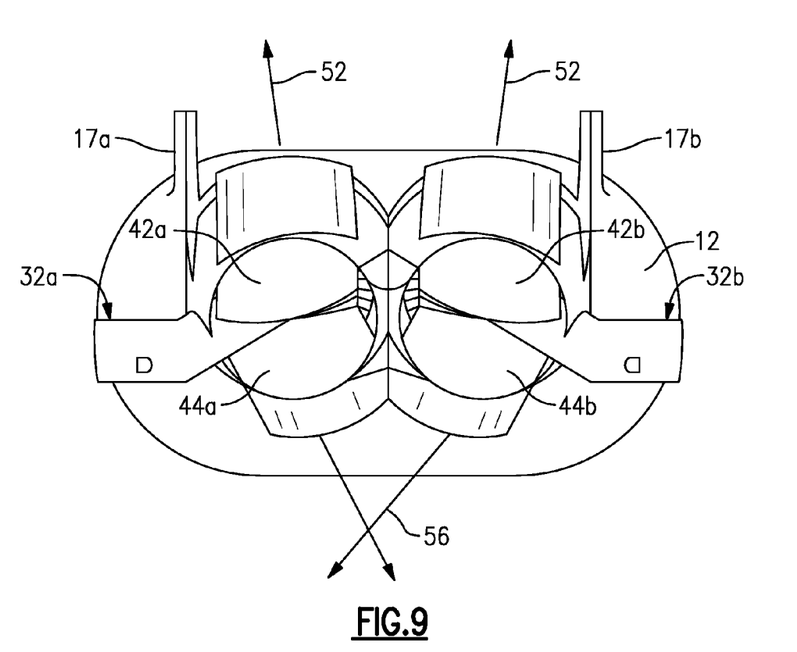
FIG. 9 is an aft view of the example thrust reverser in the deployed position.

Referring to FIGS. 7, 8 and 9, the asymmetric movement of the upper and lower doors 42a-b, 44a-b require contoured surfaces 62 to close along the axes A1, A2 to redirect both core flow and bypass flow as reverse thrust 52, 56. In this example, the upper doors 42a-b include the contoured edge 62, however, the lower doors 44a-b may include the contoured edge. Moreover, both the upper and lower doors 42a-b, 44a-b may include contoured surfaces to define an interface required by the pivoting movement about the different first and second pivot axes. 58, 60.

First and second bifurcations 50a-b are provided to direct air from the first and second inlets 32a-b, to the corresponding engine core 20a-b. The bifurcations 50a-b extend at least partially into the corresponding bypass passage 36a-b and are therefore considerations are made in the upper and lower doors 42a-b, 44a-b to provide the desired closure and redirection of airflow to provide the reverse thrust 52, 56. In this example the upper and lower doors 42a-b, 44a-b is contoured to accommodate the bifurcations 50a-b. The upper and lower doors 42a-b, 44a-b, are contoured to close around and on the bifurcations 50a-b and substantially seal of airflow through the aft opening of the bypass passages 36a-b.

Accordingly, the example thrust reversers 40a-b, include upper and lower blocker doors 42a-b, 44a-b that open about non-parallel pivot axes to provide asymmetric upward directed thrust and downward directed thrust. The asymmetry provides for avoidance of control surfaces above the propulsion system 18 and the generation of lift below the aircraft 10.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft comprising;
a fuselage including an aft portion;
a propulsion system supported within the aft portion of the fuselage, the propulsion system including a fan within a bypass passage disposed about a propulsor axis; and
a thrust reverser mounted in the aft portion of the fuselage proximate to the propulsion system for directing thrust in a direction to slow the aircraft, wherein the thrust reverser includes an upper blocker door rotatable about a first pivot axis to a deployed position and a lower blocker door rotatable about a second pivot axis not parallel to the first pivot axis, wherein at least one of the upper blocker door and the lower blocker door extends transversely past the propulsor axis when in the deployed position.

2. The aircraft as recited in claim 1, wherein the first pivot axis is substantially horizontal and the second pivot axis is angled downward away from first pivot axis.

3. The aircraft as recited in claim 1, wherein at least one of the upper and lower blocker doors includes a contoured aft edge defining an interface when the upper and lower doors are in the deployed position.

4. The aircraft as recited in claim 3, wherein the upper blocker door comprises first and second blocker doors, the lower blocker door comprises first and second blocker doors and the bypass passage comprises first and second bypass passaged disposed about corresponding first and second propulsor axes, the first and second upper and lower blocker doors direct thrust generated through first and second bypass passages defined about corresponding first and second propulsor axes.

5. The aircraft as recited in claim 4, wherein the propulsion system comprises a first engine core driving a first fan within the first bypass passage disposed about the first propulsor axis and a second engine core driving a second fan within the second bypass passage disposed about the second propulsor axis.

6. The aircraft as recited in claim 4, wherein the first and second lower blocker doors rotate about corresponding second pivot axes and are angled toward each other.

7. The aircraft as recited in claim 4, wherein the first and second upper blocker doors and the first and second lower blocker doors close on a corresponding one of the first propulsor axis and the second propulsor axis to capture both a bypass flow stream and a core flow stream.

8. An aircraft comprising;
a fuselage including an aft portion;
a propulsion system supported within the aft portion of the fuselage, wherein the propulsion system comprises a first engine core driving a first fan within the first bypass passage disposed about the first propulsor axis and a second engine core driving a second fan within the second bypass passage disposed about the second propulsor axis; and
a thrust reverser mounted in the aft portion of the fuselage proximate to the propulsion system for directing thrust in a direction to slow the aircraft, wherein the thrust reverser includes an upper blocker door rotatable about a first pivot axis to a deployed position and a lower blocker door rotatable about a second pivot axis not parallel to the first pivot axis, the upper blocker door comprises first and second blocker doors and the lower blocker door comprises first and second blocker doors and the first and second upper and lower blocker doors direct thrust generated through first and second bypass passages defined about corresponding first and second propulsor axes with at least one of the upper and lower blocker doors includes a contoured aft edge defining an interface when the upper and lower doors are in the deployed position and T each of the first and second bypass passages include a bifurcation and each of the first and second upper doors and first and second lower doors include a contoured aft edge that close onto the bifurcation.

9. The aircraft as recited in claim 5, wherein the first and second upper doors and the first and second lower doors close on a centerline disposed along corresponding first and second propulsor axes.

10. The aircraft as recited in claim 1, wherein the aircraft includes first and second vertical stabilizer disposed on each side of the propulsion system and a horizontal stabilizer supported on the first and second vertical stabilizers.

* * * * *